US012803798B2

(12) United States Patent
Zhang et al.

(10) Patent No.: US 12,803,798 B2
(45) Date of Patent: Nov. 17, 2026

(54) DATA TRANSMISSION METHOD AND RELATED DEVICE

(71) Applicant: Beijing Bytedance Network Technology Co., Ltd., Beijing (CN)

(72) Inventors: Lin Zhang, Beijing (CN); Wenbin Zhang, Beijing (CN); Yong Sun, Beijing (CN); Qingling Feng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 261 days.

(21) Appl. No.: 18/706,350

(22) PCT Filed: Feb. 24, 2023

(86) PCT No.: PCT/CN2023/078239

§ 371 (c)(1),
(2) Date: Apr. 30, 2024

(87) PCT Pub. No.: WO2023/174038

PCT Pub. Date: Sep. 21, 2023

(65) Prior Publication Data

US 2026/0128875 A1 May 7, 2026

(30) Foreign Application Priority Data

Mar. 17, 2022 (CN) ......................... 202210267993.3

(51) Int. Cl.
*H04L 9/08* (2006.01)

(52) U.S. Cl.
CPC .......... *H04L 9/0877* (2013.01); *H04L 9/0825* (2013.01)

(58) Field of Classification Search
None
See application file for complete search history.

(56) References Cited

U.S. PATENT DOCUMENTS 6,161,181 A * 12/2000 Haynes, III ......... H04L 63/0823 713/153
8,996,887 B2 * 3/2015 Kadatch ................ G06F 21/554 713/168

(Continued)

FOREIGN PATENT DOCUMENTS

CN 109361668 A 2/2019
CN 110011801 A 7/2019

(Continued)

OTHER PUBLICATIONS

International Search Report in PCT/CN2023/078239, mailed Jun. 1, 2023, 3 pages.

(Continued)

*Primary Examiner* — Teshome Hailu
*Assistant Examiner* — Mahabub S Ahmed
(74) *Attorney, Agent, or Firm* — Astute IP Law Group

(57) ABSTRACT

Provided in the present application are a data transmission method and related device. The method comprises: receiving a transmission preparation request sent by a user end before sending transmission data, and generating configuration information based on at least part of the data in the transmission preparation request; generating an authentication request through a trusted execution environment based on the configuration information and sending the authentication request to the user end, so that the user end envelope-encrypts the transmission data based on the authentication request; receiving feedback information sent from the user end, the feedback information comprising envelope-encrypted transmission data; and obtaining the transmission data by decrypting the feedback information.

18 Claims, 4 Drawing Sheets

(56) References Cited

U.S. PATENT DOCUMENTS

| | | | | |
|---|---|---|---|---|
| 9,973,481 | B1 * | 5/2018 | Sharifi Mehr | H04L 9/0825 |
| 10,211,992 | B1 * | 2/2019 | Tarandach | H04L 9/3268 |
| 10,715,339 | B1 | 7/2020 | Wei et al. | |
| 10,728,044 | B1 | 7/2020 | Melo et al. | |
| 11,356,427 | B1 * | 6/2022 | Griffin | G06F 21/6209 |
| 11,502,827 | B1 * | 11/2022 | Miller | H04L 9/3242 |
| 11,784,811 | B2 * | 10/2023 | Rubin | H04L 9/3247 713/193 |
| 2001/0037453 | A1 * | 11/2001 | Mitty | H04L 63/08 713/168 |
| 2002/0138735 | A1 * | 9/2002 | Felt | H04L 9/3247 713/176 |
| 2002/0138759 | A1 * | 9/2002 | Dutta | H04L 63/062 726/30 |
| 2005/0154889 | A1 * | 7/2005 | Ashley | H04L 9/3234 713/171 |
| 2006/0248336 | A1 * | 11/2006 | Bruns | H04L 9/0822 713/171 |
| 2007/0168048 | A1 * | 7/2007 | Allen | G06F 21/74 700/2 |
| 2008/0130893 | A1 * | 6/2008 | Ibrahim | G06F 21/572 380/277 |
| 2013/0230171 | A1 * | 9/2013 | Ivanchykhin | H04N 21/6334 380/255 |
| 2013/0232339 | A1 * | 9/2013 | Ignatchenko | H04N 21/2347 713/171 |
| 2013/0275755 | A1 * | 10/2013 | Ignatchenko | H04N 21/4408 713/168 |
| 2014/0250215 | A1 * | 9/2014 | Bowen | H04L 41/0895 709/223 |
| 2015/0350251 | A1 * | 12/2015 | Brander | H04L 63/105 713/168 |
| 2015/0363775 | A1 * | 12/2015 | Li | H04L 9/321 705/71 |
| 2016/0234176 | A1 | 8/2016 | Chu et al. | |
| 2016/0352521 | A1 * | 12/2016 | Choi | H04L 9/3247 |
| 2017/0171219 | A1 * | 6/2017 | Campagna | H04L 9/0841 |
| 2018/0191501 | A1 * | 7/2018 | Lindemann | H04L 9/0833 |
| 2018/0191695 | A1 * | 7/2018 | Lindemann | H04L 63/0853 |
| 2018/0212940 | A1 * | 7/2018 | Novak | H04L 63/0281 |
| 2018/0351921 | A1 * | 12/2018 | Sharifi Mehr | H04L 63/205 |
| 2019/0058577 | A1 | 2/2019 | Bowman et al. | |
| 2019/0362083 | A1 | 11/2019 | Ortiz et al. | |
| 2020/0111080 | A1 * | 4/2020 | Metcalfe | H04L 9/3255 |
| 2020/0125717 | A1 * | 4/2020 | Wang | H04L 9/0877 |
| 2020/0169387 | A1 * | 5/2020 | Wei | H04L 9/3234 |
| 2020/0177604 | A1 * | 6/2020 | Wei | H04L 9/3239 |
| 2020/0274849 | A1 * | 8/2020 | Smith | H04L 63/0421 |
| 2020/0342092 | A1 | 10/2020 | Wei et al. | |
| 2021/0067338 | A1 * | 3/2021 | Yu | H04L 9/321 |
| 2021/0090066 | A1 * | 3/2021 | Beye | G06Q 20/02 |
| 2021/0117246 | A1 * | 4/2021 | Lal | G06F 9/5083 |
| 2021/0144004 | A1 * | 5/2021 | Gray | H04L 9/0891 |
| 2021/0243018 | A1 * | 8/2021 | Jacobs | H04L 9/0894 |
| 2021/0326476 | A1 * | 10/2021 | Su | H04L 9/50 |
| 2022/0150220 | A1 * | 5/2022 | Verheyen | H04L 9/50 |
| 2022/0271933 | A1 * | 8/2022 | Chen | H04L 9/085 |
| 2023/0216662 | A1 * | 7/2023 | Chan | H04L 9/0897 713/171 |
| 2025/0358265 | A1 * | 11/2025 | Mitchell | H04L 9/0825 |

FOREIGN PATENT DOCUMENTS

| | | | |
|---|---|---|---|
| CN | 110046906 | A | 7/2019 |
| CN | 110138799 | A | 8/2019 |
| CN | 110519260 | A | 11/2019 |
| CN | 111082934 | A | 4/2020 |
| CN | 112637131 | A | 4/2021 |
| CN | 112948810 | A | 6/2021 |
| CN | 112989319 | A | 6/2021 |
| CN | 113742709 | A | 12/2021 |
| CN | 113839969 | A | 12/2021 |
| CN | 113869901 | A | 12/2021 |
| CN | 114553590 | A | 5/2022 |
| DE | 102018101307 | A1 | 8/2018 |
| WO | 2018112482 | A1 | 6/2018 |
| WO | 2021184962 | A1 | 9/2021 |
| WO | 2021184968 | A1 | 9/2021 |

OTHER PUBLICATIONS

Office Action in Chinese Patent Application No. 202210267993.3, mailed Apr. 12, 2023, 7 pages.

Notification to Grant Patent Right for Invention for Chinese Patent Application No. 202210267993.3, mailed on Jul. 28, 2023, 6 pages.

* cited by examiner

DATA TRANSMISSION METHOD AND RELATED DEVICE

CROSS-REFERENCE TO RELATED APPLICATION(S)

This is a national stage application based on International Patent Application No. PCT/CN2023/078239, filed Feb. 24, 2023, which claims priority to the Chinese invention patent application titled "DATA TRANSMISSION METHOD AND RELATED DEVICE" and application number CN202210267993.3, submitted on Mar. 17, 2022, the disclosures of which are incorporated herein by reference in their entireties.

FIELD

The present application relates to a technical field of data processing in a trusted execution environment, and in particular, to a data transmission method and related device.

BACKGROUND

SGX (Software Guard eXtensions) based data processing applications may use Intel hardware instructions to protect programs, data, keys and the like so as to effectively prevent information leakage caused by malware and internal and external attacks. The remote authentication process and secure data transmission are the security foundation of SGX-based applications. Remote authentication ensures the credibility of the SGX processor and user identity authentication through SGX instructions and protocol interaction; the trusted key generated by remote authentication may ensure the secure transmission of data.

However, most of existing remote authentication solutions consider the key negotiation form to establish data keys and use symmetric form data keys for data transmission. This method is not suitable for users who cannot securely store their keys.

SUMMARY

In view of this, the purpose of this application is to propose a data transmission method and related device to solve or partially solve the above technical problems.

Based on the above purpose, the first aspect of this application provides a data transmission method, comprising:

Receiving a transmission preparation request sent by a user end before sending transmission data, and generating configuration information based on at least part of data in the transmission preparation request;

Generating an authentication request through a trusted execution environment based on the configuration information and sending the authentication request to the user end, so that the user end envelope-encrypts the transmission data based on the authentication request;

Receiving feedback information sent from the user end, the feedback information comprising envelope-encrypted transmission data; and Obtaining the transmission data by decrypting the feedback information.

In some embodiments, the receiving a transmission preparation request sent by the user end before sending transmission data, and generating configuration information based on at least part of data in the transmission preparation request comprises:

Receiving from the user end a transmission preparation request that comprises at least one of a key length, an encryption mode, identification information of the user end and a second value;

Generating configuration information by integrating at least one of the key length, the encryption mode, the identification information of the user end and the second value.

In some embodiments, the generating an authentication request through a trusted execution environment based on the configuration information and sending the authentication request to the user end comprises:

Generating a temporary public key based on the second value in the configuration information;

Obtaining second identification data by perform cryptographic operation processing on the identification information of the user end;

Obtaining an operation processing result by performing cryptographic operation processing on the configuration information, the second identification data and the temporary public key, and generating quote data based on the operation processing result;

Generating an authentication request based on the configuration information, the second identification data, the temporary public key and the quote data and sending the authentication request to the user end.

In some embodiments, the generating a temporary public key based on the second value in the configuration information comprises:

Obtaining a first public key of the trusted hardware end, randomly generating a first value, and generating a temporary public key based on the first public key, the first value and the second value.

In some embodiments, the cryptographic operation processing includes: hash operation processing.

In some embodiments, the obtaining an operation processing result by performing cryptographic operation processing on the configuration information, the second identification data and the temporary public key, and generating quote data based on the operation processing result comprises:

Obtaining a hash value by performing hash operation processing on data that is composed of the configuration information, the second identification data and the temporary public key;

Obtaining report data by supplementing a predetermined number of supplementary values after the hash value, generating quote data by writing the report data to a user data report, and reading the quote data.

In some embodiments, the feedback information comprises: signature data, key cipher text, encrypted data and a user end certificate;

The obtaining the transmission data by decrypting the feedback information comprises:

Parsing the feedback information, verifying the user end certificate using a root certificate, and confirming that the user end's identity is true after passing the verification;

Obtaining a second public key of the user end, verifying the signature data using the second public key, and confirming that the signature data is true after passing the verification;

Obtaining a first private key of the trusted hardware end, and obtaining key data by decrypting the key cipher text with the first private key;

Obtaining the transmission data by decrypting the encrypted data with the key data.

Based on the same inventive concept, the second aspect of this application is a data transmission method, which is characterized in that, applied to the user end, the method includes:

Sending a transmission preparation request to the trusted hardware end based on received transmission preparation data;

Receiving an authentication request sent from the trusted hardware end, and parsing and confirming the authentication request;

In response to determining that the authentication request is true, obtaining envelope-encrypted transmission data by performing envelope encryption on transmission data;

Generating feedback information based on the envelope-encrypted transmission data, and sending the feedback information to the trusted hardware end.

In some embodiments, the authentication request comprises: configuration information, second identification data and quote data;

The parsing and confirming the authentication request comprises:

Obtaining configuration information, second identification data and quote data by parsing the authentication request;

Obtaining identification confirmation information by performing cryptographic operation processing on identification information of the user end in the configuration information, and comparing and confirming the identification confirmation information with the second identification data;

Verifying the quote data by calling Internet Authentication and Certificate Services;

The responding to determining that the authentication request is true comprises:

Determining that the identification confirmation information matches the second identification data, and determining that the quote data passes the verification of the service information.

In some embodiments, the cryptographic operation processing includes: hash operation processing.

In some embodiments, the authentication request further comprises: a temporary public key;

The obtaining envelope-encrypted transmission data by performing envelope encryption on the transmission data comprises:

Determining key data, and obtaining encrypted data by encrypting the transmission data with the key data;

Extract a first public key from a temporary public key, and obtaining key cipher text by encrypting the key data;

Forming a data combination based on the temporary public key, the key cipher text, and the encrypted data;

Obtaining a second private key of the user end, and obtaining signature data by signing the data combination with use the second private key;

Wherein, the envelope-encrypted transmission data comprises: the signature data, the key cipher text and the encrypted data.

In some embodiments, the generating feedback information based on the envelope-encrypted transmission data and sending the feedback information to the trusted hardware end comprises:

Obtaining certificate data of the user end, and generating feedback information by combining the certificate data of the user end with the envelope-encrypted transmission data;

Sending the feedback information to the trusted hardware end, and outputting the key data and the temporary public key at the same time.

Based on the same inventive concept, the third aspect of this application proposes a data transmission device, which is provided on a trusted hardware terminal. The device includes:

A preparation processing module, configured to receive a transmission preparation request sent by the user before sending transmission data, and generate configuration information based on at least part of the data in the transmission preparation request;

A request generation and sending module, configured to generate an authentication request through a trusted execution environment based on the configuration information and send it to the user end, so that the user end encrypts the transmission data according to the authentication request;

A feedback receiving module, configured to receive feedback information sent from the user end, where the feedback information includes envelope-encrypted transmission data;

A decryption module, configured to decrypt the feedback information to obtain the transmission data.

Based on the same inventive concept, the fourth aspect of this application proposes a data transmission device, which is provided on the user end. The device includes:

A preparation data sending module is used to send a transmission preparation request to the trusted hardware end based on the received transmission preparation data;

An authentication request parsing module is used to receive the authentication request sent from the trusted hardware end and parse and confirm the authentication request;

An envelope encryption module, used to perform envelope encryption on the transmission data after determining that the authentication request is correct, and obtain the envelope-encrypted transmission data;

A feedback module is configured to generate feedback information based on the encrypted transmission data of the envelope, and send the feedback information to the trusted hardware end.

Based on the same inventive concept, the fourth aspect of the application proposes an electronic device, including a memory, a processor, and a computer program stored in the memory and executable on the processor. When the processor executes the program, The methods described in the first and second aspects.

Based on the same inventive concept, the fourth aspect of the present application proposes a non-transitory computer-readable storage medium. The non-transitory computer-readable storage medium stores computer instructions. The computer instructions are used to cause the computer to execute the first step. aspect and the method described in the second aspect.

It can be seen from the above that the data transmission method and related device provided by this application can use envelope encryption to encrypt the transmitted data during the data transmission process. Envelope encryption is an encryption method that is simple and fast to operate. Data transmission does not require the storage of symmetric data keys on the user side, which can effectively improve the security of transmitted data. When data transmission is based on envelope encryption, only one round of interaction is needed to complete the data transmission process, effectively improving data transmission efficiency.

BRIEF DESCRIPTION OF THE DRAWINGS

In order to explain the technical solutions in the present application or related technologies more clearly, the drawings needed to be used in the description of embodiments or related technologies will be briefly introduced below. Obviously, the drawings in the following description are only the embodiments of the present application, for those of ordinary skill in the art, other drawings can also be obtained based on these drawings without exerting creative efforts.

DETAILED DESCRIPTION

Figure 1:
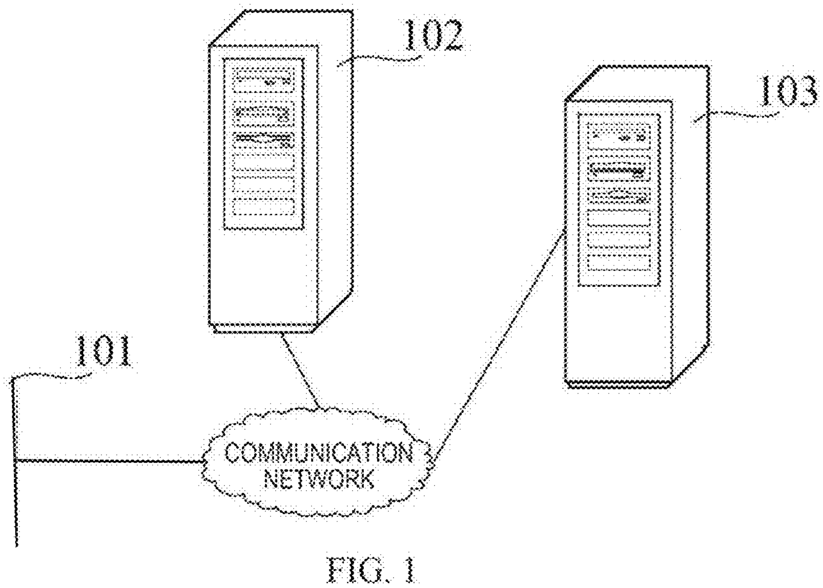
FIG. 1 is a schematic diagram of an application scenario of the embodiments of the present application.

The principles and spirit of the present application will be described below with reference to several exemplary embodiments. It should be understood that these embodiments are only provided to enable those skilled in the art to better understand and implement the present application, but are not intended to limit the scope of the present application in any way. Rather, these embodiments are provided so that this disclosure will be thorough and complete, and will fully convey the scope of the disclosure to those skilled in the art.

In this article, it is to be understood that any number of elements in the drawings is for illustration and not limitation, and any naming is for distinction only and does not have any limiting meaning.

Based on the above description of background, the following situations further exist in the related art:

Remote authentication is the security foundation for TEE (Trusted Execution Environment) based trusted execution environment applications. Currently, the Intel SGX (Intel Software Guard extensions) remote authentication protocol contains the following solutions:

SGX SDK (Software Development Kit) SampleCode remote authentication mode: 4-pass (i.e., 2-round) form of Sign-And-Mac protocol, which has high and theoretically proven security. It is the remote authentication protocol solution recommended by Intel. However, due to the large number of interactions, the user side needs to maintain local storage to save the intermediate values of two sessions, which increases the deployment burden.

Gramine low-level remote authentication mode: by writing the corresponding data to /dev/attestation/user_report_data, a quote will be generated in /dev/attestation/, and the content of /dev/attestation/quote will be read to get the quote. This solution is the foundation for building a remote authentication protocol solution in Gramine, but it cannot be used alone.

Gramine mid-level remote authentication mode: using the mbedtls tool to embed the quote generated by Gramine low-level into the X.509 form certificate, and implementing key negotiation through the regular TLS (Transport Layer Security) protocol. This solution is also called RA-TLS by Gramine. This solution follows the one-way authentication TLS protocol, which will bring a greater number of interactions, cannot support envelope encryption mode, and cannot meet the needs of most TEE applications.

Gramine high-level remote authentication mode: following Gramine mid-level, performing two-way authentication through the certificates of both parties, and implementing secret provisioning. That is, the user transfers the data key to SGX's trusted execution environment Enclave through mid-level. This method will also introduce a large number of interactions and cannot support envelope encryption mode.

Envelope encryption: a convenient, secure and commonly used encryption protection method. This method allows data owners to avoid using the same data key to encrypt large amounts of data all the time, and can instead use a randomly generated data key for each data separately, thereby improving the convenience and security of use in some scenarios.

When encrypting and transmitting data using encryption methods other than envelope encryption, the following problems often occur:

I. The lack of two-way authentication of identities leads to unknown key sharing attacks:

Two-way authentication: two-way authentication of each other's identities between the user (Verifier) and SGX's trusted execution environment Enclave (Attestor), that is, the user confirms that it is a legitimate TEE that is providing the service, and the TEE confirms the user's identity and that the incoming data is and can only be provided by that legitimate user.

Unknown key sharing attack: a type of man-in-the-middle attack. Verifier A wants to complete remote authentication with Attestor. After Attestor sends req (request) to Verifier A, Verifier A will generate resp (feedback). The attacker registers as a legitimate VerifierB, intercepts the resp, replaces sig and cert in the resp with its own to form resp', and then sends the resp' to the Attestor's session. At this point, Attestor thinks that it has completed the session with VerifierB, and VerifierA thinks that it has completed the session with Attestor. At this point, if Verifier A sends a cipher text of "transfer 10 yuan to my account" to Attestor, Attestor will transfer 10 yuan to Verifier B's account. Thus, the security of data transmission cannot be guaranteed.

The lack of reverse authentication of low-level in Gramine: this remote authentication mode only supports Attestor to authenticate Verifier, and there is the aforementioned unknown key sharing attack. In some scenarios, this might lead to security risks such as a host pretending to be a legitimate user to brute-force exhaust private data from the database.

II. The lack of freshness guarantee for messages leads to the existence of replay attacks:

Freshness: The message and its content are fresh, that is, they are currently sent by the user, rather than historical messages.

Replay attack: In the event of key leakage, the attacker sends a historical message containing the key to the Attestor as a new message, and replays the message to make the Attestor accept the key, which will cause data leakage.

III. A large number of interaction rounds lead to low efficiency:

The above SGX SDK SampleCode remote authentication mode, Gramine mid-level remote authentication mode and Gramine high-level remote authentication modes all have the disadvantage of large number of interaction rounds.

Based on the above description, the principles and spirit of the present application will be explained in detail below with reference to several representative implementations of the present application.

The present application provides a data transmission method and related device, which can use envelope encryption to encrypt the transmitted data during the data transmission process. Envelope encryption is an encryption method that is simple and fast to operate. Data transmission in the form of envelope encryption does not require the end-end storage of symmetric data keys and can effectively improve the security of transmitted data. When data transmission is based on envelope encryption, only one round of interaction is needed to complete the data transmission process, which can effectively improve the efficiency of data transmission.

Refer to FIG. 1, which is a schematic diagram of an application scenario of a data transmission method provided by embodiments of the present application. The application scenario comprises a terminal device 101 (i.e., the user end), the server 102 (i.e., the trusted hardware end), and a data storage system 103. The terminal device 101, the server 102 and the data storage system 103 may all be connected through a wired or wireless communication network. The terminal device 101 includes, but is not limited to, a desktop computer, a mobile phone, a mobile computer, a tablet computer, a media player, a smart wearable device, a personal digital assistant (PDA) or other electronic devices that can implement the above functions. Both the server 102 and the data storage system 103 may be independent physical servers, or a server cluster or distributed system composed of a plurality of physical servers, or cloud servers that provides basic cloud computing services such as cloud services, cloud databases, cloud computing, cloud functions, cloud storage, network services, cloud communications, middleware services, domain name services, security services, CDN, and big data and artificial intelligence platforms.

The server 102 runs in a trusted execution environment. When the user wants to transmit data to the server 102, the user sets the transmission preparation data through the terminal device 101 and generates a transmission preparation request and sends it to the server 102; then the server 102 generates configuration information based on the transmission preparation request, generates an authentication request based on the configuration information and sends it to the terminal device 101; after parsing and confirming the authentication request, the terminal device 101 performs envelope encryption on the transmission data, generates feedback information based on the envelope-encrypted transmission data, and sends the feedback information to the server 102; the server 102 decrypts the feedback information to obtain the transmission data. Thus, the data transmission process is completed. The data storage system 103 provides data storage support for the operation of the server 102.

Description is presented below to the data transmission method according to the example implementation of the present application in conjunction with the application scenario of FIG. 1. It should be noted that the above application scenario is only shown to facilitate understanding of the spirit and principles of the present application, and the implementation of the present application is not limited in this regard. On the contrary, the implementation of the present application may be applied to any applicable scenario.

The present patent proposes a data transmission method. Transmission data can be encrypted using envelope encryption during the data transmission process. Envelope encryption is an encryption method that is simple and fast to operate, which can effectively improve the security of transmission data. When transmitting data based on envelope encryption, only one round of interaction is required to complete the data transmission process, thereby effectively improving the efficiency of data transmission.

An embodiment of the present application provides a data transmission method. Based on each of the above application scenarios, the method may be run in a trusted execution environment through a trusted hardware end (for example, a server or a computer device).

Figure 2:
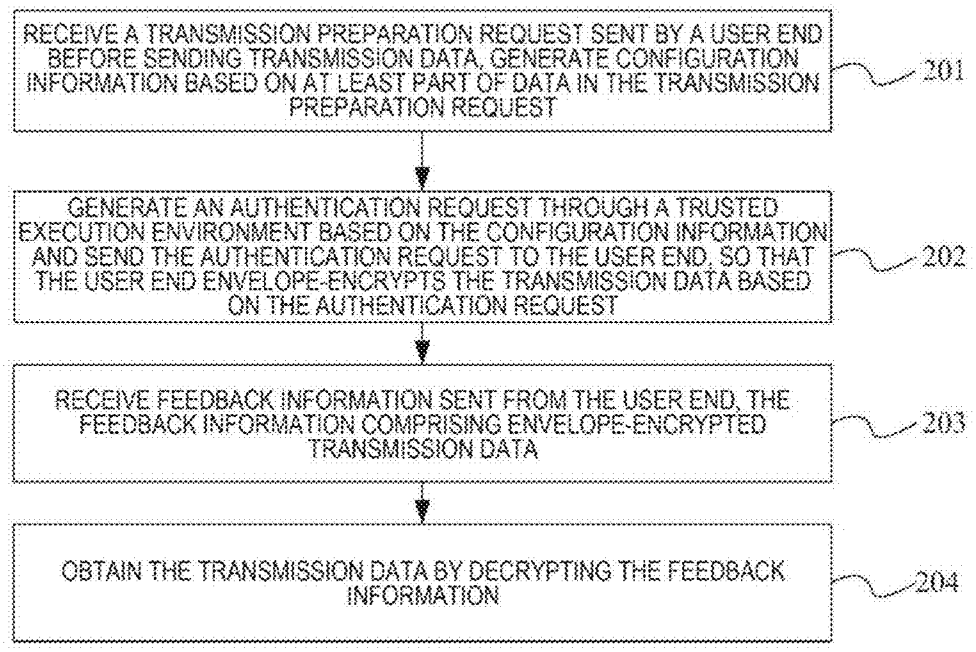
FIG. 2 is a flow chart of a data transmission method applied to the trusted hardware end of the embodiments of the present application.

As shown in FIG. 2, the specific execution of this method through the trusted hardware end (Attestor) comprises:

Step 201: receiving a transmission preparation request sent by the user end (Verifier) before sending transmission data, and generating configuration information based on at least part of data in the transmission preparation request.

During the specific implementation, before encrypted-transmitting the transmission data, the user first enters the preparation work, sets some data needed for transmission through the user end, and generates a transmission preparation request and sends it to the trusted hardware end. In this way, the trusted hardware terminal, after receiving the transmission preparation request, also enters the preparation stage and generates configuration information according to the transmission preparation request. The corresponding configuration information may include all the data in the transmission preparation request, or may include part of the data, or may further add other data information (for example, the type of transmission data to be transmitted, the request type, etc. ,) based on the data in the transmission preparation request.

The transmission data may be at least one of text, instruction data, audio data, video data, and symbol data.

In some embodiments, step 201 comprises:

Step 2011: receiving a transmission preparation request from the user end including at least one of a key length, encryption mode, identification information of the user end, and second value.

During the specific implementation, regarding each data in the transmission preparation request:

Key length (KeyLength): set by the user based on actual needs. For example, KeyLength is the length of a symmetric key, which may select a length of 128 or 256 bytes. The specific size of the byte length may be set according to the actual situation and needs;

Encryption mode (KEMode): the user needs to select the Key Exchange (KE) mode that supports envelope encryption through the user end, so that Attestor can perform corresponding protocol operations;

Identification information (info) of the user end: info may be the unique identification code for the user end, or may be account information approved by the user and other relevant information that can represent the identity of the user end;

Second value (n2): a randomly selected or randomly generated challenge value. The length of the challenge value is preferably at least 16 bytes.

After the user sets the above data through the user end, the user may generate and send a transmission preparation request to the trusted hardware end together with application requests (such as SQL (Structured Query Language) queries, keyword searches, etc.). After receiving the transmission preparation request, the trusted hardware end parses all the above data for subsequent generation of configuration information based on these data.

The user may pre-set and save each data in the transmission preparation request, so that each time a transmission preparation request is initiated, the data may be directly retrieved without repeated settings. In addition, the user may also change or adjust the settings of these data.

Step 2012: configuring and integrating at least one of the key length, the encryption mode, the identification information of the user end, and the second value to generate configuration information (cf).

During the specific implementation, after the user end sends the above-mentioned transmission preparation request, the user end will enter the preparation stage together with the trusted hardware end. The trusted hardware end generates configuration information according to the above scheme, and the user end will preload a second private key, second public key pk2, user-end certificate cert, transmission data.

In this way, all the work for the preparation stage of the trusted hardware end and the user end is completed, and the following proceeds to the encrypted transmission stage.

Step 202: generating an authentication request through a trusted execution environment based on the configuration information and sending the same to the user end, so that the user end envelope-encrypted the transmission data based on the authentication request.

During the specific implementation, the trusted hardware end may generate an authentication request based on the configuration information in combination with some authentication data of the trusted hardware end and send the same to the user end, so that the user end can authenticate the identity of the trusted hardware end based on the authentication request and, after determining the identity of the trusted hardware end, perform envelope encryption on the transmission data obtained in the above preparation stage.

During the envelope encryption stage, the transmission data is encrypted using the key data to obtain the encrypted data, and the key data is further encrypted to obtain the key cipher text. This double encryption method is envelope encryption, and then the envelope-encrypted key cipher text and encrypted data are obtained, which will be used as envelope-encrypted transmission data.

Envelope encryption on the user end allows data owners to avoid using the same data key to encrypt large amounts of data. Instead, a randomly generated key data is used use for each piece of data separately, which can improve the convenience and security of use in some scenarios.

In some embodiments, step 202 comprises:

Step 2021: generating a temporary public key based on the second value in the configuration information.

In some embodiments, a first public key of the trusted hardware end is obtained, and a first value is randomly generated. Then, a temporary public key is generated based on the first public key, the first value and the second value.

During the specific implementation, a pair of public and private keys (rsk, rpk) of the trusted hardware is randomly generated or recovered, and the pair of public and private keys is generated through RSA3072, where RSA is a cryptographic algorithm, 3072 is the number of digits, rsk is a first private key, and rpk is a first public key. Then, a first value is randomly selected as the challenge value n1, which is at least 16 bytes long.

After obtaining the above data, the temporary public key epk1=rpk||n1||n2 may be generated based on the second value n2 in the generated configuration information.

The temporary public key generated above can contain the above various data, which effectively improves the security of the temporary public key and reduces the risk of being cracked.

Step 2022: obtaining second identification data by performing cryptographic operation processing on the identification information of the user end. In some embodiments, the cryptographic operation processing comprises: hash operation processing.

During the specific implementation, according to the identification information info (the length is variable) of the user end, the identification information of the user end is hashed to obtain id2=H(info), which will be used as the second identification data.

Step 2023: obtaining an operation processing result by performing cryptographic operation processing on the configuration information, the second identification data and the temporary public key, and generating quote data based on the operation processing result.

In some embodiments, step 2023 comprises:

Step 20231: obtaining a hash value by performing hash operation processing on data composed of the configuration information, the second identification data and the temporary public key.

During the specific implementation, the calculation formula of the hash value Hash is: Hash=H(cf||id2||epk1).

Step 20232: obtaining report data by supplementing a predetermined number of supplementary values after the hash value, generating quote data by writing the report data into a user data report, and reading the quote data.

During the specific implementation, the length corresponding to the required report data is set to a predetermined length. If the length of the obtained hash value is not enough, it needs to be supplemented by a predetermined number of supplementary values to obtain the complete report data. For example, the predetermined length of the report data is 64 bytes while the obtained hash value is 32 bytes, so the corresponding predetermined number of supplementary values is 32 bytes of "0".

Then, the report data is written into the user data report to automatically generate the corresponding quote data, so that the generated quote data may be read out. For example, by writing the 64-byte report data to the user data report, that is, /dev/attestation/user_report_data, the quotation data quote will be generated in /dev/attestation/, so that the content quote of /dev/attestation/quote may be read.

Step 2024: generating an authentication request based on the configuration information, the second identification data, the temporary public key and the reference data, and sending the authentication request to the user end.

During the specific implementation, the configuration information cf, the second identification data id2, the temporary public key epk1 and the quotation data quote are combined to form an authentication request req=cf||id2||epk1||quote. The authentication request is sent to the user end.

In this way, the client can confirm the authentication request. After the confirmation is passed, the transmission data may be envelope-encrypted to obtain the feedback information resp including the signature data sig, key cipher text c, encrypted data e and user end certificate cert. The user end will send the feedback information resp to the trusted hardware end.

Step 203: receiving feedback information from the user end, the feedback information comprising envelope-encrypted transmission data.

During the specific implementation, the trusted hardware end, after receiving the feedback information, will parse the feedback information to parse out the signature data sig, key cipher text c, encrypted data e and user end certificate cert for analysis and processing in subsequent steps.

Step 204: obtaining the transmission data by decrypting the feedback information.

During the specific implementation, since the transmission data in the feedback information is encrypted through envelope encryption, the envelope decryption process needs to be used during the decryption process, so that the transmission data can be correctly decrypted.

In some embodiments, step 204 comprises:

Step 2041: parsing the feedback information, verifying the user end certificate by using a root certificate, and confirming the user end identity to be true after the verification is passed.

During the specific implementation, the root certificate uses the CA (Certificate Authority, electronic certification) root certificate, and the CA root certificate is used to verify the user end certificate parsed from the feedback information. If the verification is passed (that is, confirming that the user end certificate is true), the user end identity is confirmed true before proceeding to the following steps. If the verification fails, the operation stops.

Step 2042: obtaining a second public key of the user end, verifying signature data by using the second public key, and confirming that the signature data is true after the verification is passed.

During the specific implementation, the signature data sig parsed from the feedback information is verified using the second public key pk2 of the user end Verifier, that is, Verify(pk2;sig;epk1||c||e)==true is verified to confirm that the signature data is true before proceeding to the following steps, otherwise the operation stops.

Step 2043: obtaining a first private key of the trusted hardware end, and obtaining key data by decrying the key cipher text with the first private key.

During the specific implementation, the first private key rsk in the public-private key pair on the trusted hardware end is obtained, and the key data dk=PKE (rsk;c) is obtained by decrypt the key cipher text c (for example, c=PKE(rpk;dk)) with rsk.

Step 2044: obtaining transmission data by decrypt the encrypted data with the key data.

During the specific implementation, the encrypted data e=Enc(dk; data) is decrypted using the key data dk, so that the content of the transmission data data=Decrypt(dk; e) can be obtained.

By means of the above solution, the authentication request can be sent using the trusted hardware end, and the user end, after confirming the authentication request, can feed back the envelope-encrypted transmission data to the trusted hardware end, so that the trusted hardware end can complete the envelope decryption process to obtain the transmission data. This method only requires one interaction for data transmission based on envelope encryption and decryption, which reduces the frequency of interactions and increases the efficiency of data transmission while improving the security of data transmission.

Based on the same inventive concept, an embodiment proposes a data transmission method, applied to the user end (Verifier), which may be a computer device, a mobile phone, a tablet, a wearable device, etc.

Figure 3:
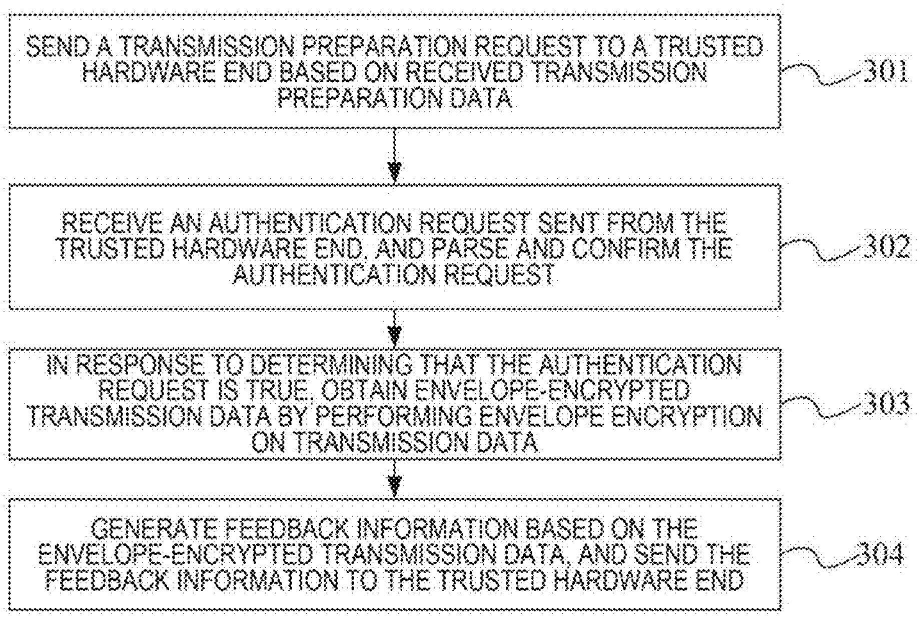
FIG. 3 is a flowchart of a data transmission method applied to the user end of the embodiments of the present application.

As shown in FIG. 3, the method comprises:

Step 301: sending a transmission preparation request to the trusted hardware end according to received transmission preparation data.

During the specific implementation, the user will set the key length and encryption mode as described in the above embodiments through the user end. The user may set the identification information for the user end and the second value, or the user end may automatically obtain the identification information of the user end and automatically generate the second value randomly. These data are used as transmission preparation data, and based thereon, a transmission preparation request is generated and sent to the trusted hardware end. This allows the trusted hardware end to enter the preparation stage and generate corresponding configuration information, and then the trusted hardware end generates an authentication request based on the configuration information according to the implementation process of step 202 and the expansion step of step 202.

In some embodiments, the authentication request comprises: configuration information, second identification data, quote data and a temporary public key.

The specific generation process of the authentication request is as described in the above embodiments and will not be detailed here.

Step 302: receiving an authentication request sent from the trusted hardware end, and parsing and confirming the authentication request.

In some embodiments, the parsing and confirming the authentication request in step 302 comprises:

Step 3021: obtaining configuration information, second identification data and quote data by parsing the authentication request.

During the specific implementation, the temporary public key will further be parsed, and the corresponding temporary public key will be used in the expansion step of subsequent step 303.

Step 3022: obtaining identification confirmation information by perform cryptographic operation processing on identification information of the user end in the configuration information, and comparing and confirming the identification confirmation information with the second identification data.

In some embodiments, the cryptographic operation processing comprises: hash operation processing.

During the specific implementation, the parsed configuration information cf contains the identification information (info) of the user end. After performing a hash operation on the info, the identification confirmation information is obtained. The identification confirmation information is confirmed with the parsed second identification data (id2). If the two match, the confirmation is passed; otherwise the confirmation fails.

Step 3023: verifying the quote data by calling Internet authentication and certificate services.

During the specific implementation, the Hash is obtained according to the formula Hash=H(cf||id2||epk1), and the parsed quote data (quote) is verified by calling Internet Authentication and Certificate Services (IAS (Immediate Access Storage)/PCCS service) based on the Hash. If the two match, the verification is passed; otherwise the verification fails.

Step 303: in response to determining that the authentication request is true, obtaining envelope-encrypted transmission data by performing envelope encryption on transmission data.

In some embodiments, step 303 comprises:

Step 3031: determining that the identification confirmation information matches the second identification data, and determining that the quote data passes the verification of the service information.

During the specific implementation, if the identification confirmation information does not match the second identification data, or the service information fails to verify the quote data, the operation stops.

Step 3032: determining key data, and obtaining encrypted data by encrypting the transmission data with the key data.

During the specific implementation, the key data dk may be obtained through random selection, manual setting by the user, or manual selection by the user, and then the encrypted data e=Enc(dk; data) is obtained by encrypting the transmission data once again with dk.

Step 3033: extracting a first public key from a temporary public key, and obtaining key cipher text by encrypting the key data.

During the specific implementation, the first public key rpk is extracted from the temporary public key epk1=rpk||n1||n2, andthe key cipher text c=PKE(rpk; dk) is obtained by encrypting the key data dk with the first public key rpk.

Step 3034: forming a data combination based on the temporary public key, the key cipher text, and the encrypted data.

The data combination is epk1||c||e.

Step 3035: obtaining a second private key of the user end, and obtaining signature data by signing the data combination with the second private key, wherein the envelope-encrypted transmission data comprises: the signature data, the key cipher text and the encrypted data.

During the specific implementation, the second private key of the user end is sk2, which is a long-term private key. sig=Sig(sk2;epk1||c||e) is obtained by signing epk1||c||e with the second private key sk2.

Step 304: generating feedback information based on the envelope-encrypted transmission data, and sending the feedback information to the trusted hardware end.

In some embodiments, step 304 comprises:

Step 3041: obtaining certificate data of the user end, and generating feedback information by combining the certificate data of the user end with the envelope-encrypted transmission data.

Step 3042: sending the feedback information to the trusted hardware end and outputting the key data and the temporary public key at the same time.

During the specific implementation, while the feedback information resp=sig||c||e||cert is sent to the trusted hardware end, the key data dk and temporary public key epk1 are output, so that the trusted hardware end obtains the transmission data through decryption based on the feedback information. The trusted hardware end may obtain a calculation result through calculation based on the transmission data. The trusted hardware symmetrically encrypts the calculation result with dk and returns the cipher text to the user end Verifier, and the Verifier performs decryption.

When the user end Verifier needs to transmit data again, the transmission data to be transmitted again is envelope-encrypted. If the user end locally stores the temporary public key epk1, feedback information may be generated and sent to the trusted hardware end from step 3032 to step 3042, and the process of steps 203 and 204 is repeatedly performed at the trusted hardware end.

Based on the same inventive concept, this embodiment uses the user-end Verifier and the trusted hardware-end Attestor to jointly complete the data transmission methods in each of the above-mentioned embodiments.

Figure 4:
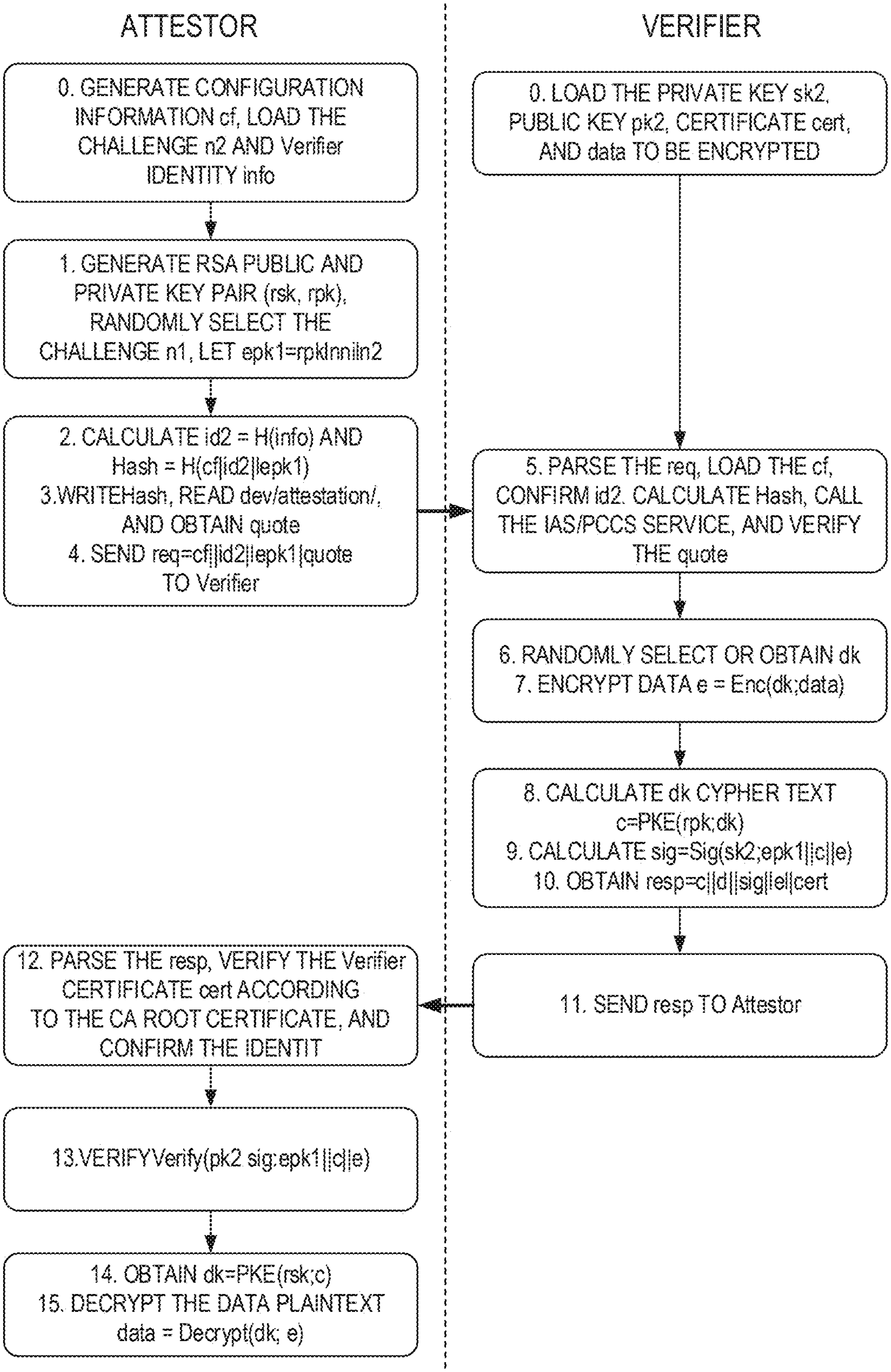
FIG. 4 is an overall flowchart of a data transmission method of implemented on the trusted hardware end and the user end of the embodiments of the present application.

As shown in FIG. 4, the specific execution process is as follows:

Prepare:

0. After receiving Key Length, KEMode, info and n2 input by the user, Attestor generates configuration information cf: wherein Key Length is the length of the symmetric key and may be selected from 128 bytes or 256 bytes; KEMode is the selected encryption mode, and the Key Exchange (KE) mode that supports envelope encryption is selected, enabling Attestor to perform corresponding protocol operations; info is the identity of Verifier and other information; n2 is a randomly selected random challenge value (at least 16 bytes in length).

0. Verifier loads the private key sk2, public key pk2, certificate cert, and data to be encrypted (that is, transmission data).

Attestor initiates a request

1. Randomly generate or recover the RSA3072 first public and private key pair (rsk, rpk), randomly select the challenge value n1 (at least 16 bytes in length), let epk1=rpk||n1||n2.

2. Based on the identity information info (the length is variable), calculate the hash value id2=H(info) of the identity information info; then calculate Hash=H(cf||id2||epk1).

3. Hash the 32-byte hash value, fill it with 32 Bytes "0" as report data, write the 64-byte long report data result to /dev/attestation/user_report_data, generate the quote in dev/attestation/, and then read the contents of /ev/attestation/quote.

4. Send req=cf||id2||epk1||quote to Verifier.

Verifier responds

5. After receiving the req from Attestor, first parse the req, then read the cf, then calculate the id2 and confirm the identity, then calculate the Hash, call the IAS/PCCS service, and verify the quote.

6. Randomly select or obtain the data key dk.

7. Encrypt data e=Enc(dk; data).

8. Extract the public key rpk of RSA3072 from epk1, and obtain c=PKE(rpk;dk) by encrypting the data key.

9. Obtain sig=Sig(sk2;epk1||c||e) by signing epk1||c||e with Verifier's long-term private key sk2.

10. Let resp=sig||c||e||cert.

11. Send resp to Attestor and output dk and epk1 at the same time.

Attestor calculates a result

12. After receiving the resp from Verifier, parse the resp, verify the Verifier certificate cert according to the CA root certificate, and confirm the Verifier identity.

13. Verify the signature sig using Verifier's public key pk2 to, that is, verify Verify(pk2;sig;epk1||c||e)==true.

14. Obtain the data key dk=PKE(rsk;c) by decrypting the cipher text c with the private key rsk of RSA3072.

15. Decrypt the data plaintext data=Decrypt(dk; e).

The result calculated in Attestor may be symmetrically encrypted using dk, and the cipher text is returned to Verifier for decryption; when Verifier performs encrypted transmission of data once again, if there is epk1 locally, the above operations may proceed directly from step 6.

By means of the solutions described in the above embodiments, transmission data may be encrypted using envelope encryption during the data transmission process. Such the encryption method as envelope encryption is simple and fast to operate. Data transmission in the form of envelope encryption does not require symmetric data keys to be stored on the user end, which can effectively improve the security of transmission data. When data transmission is based on envelope encryption, only one round of interaction is needed to complete the data transmission process, effectively improving the efficiency of data transmission.

It should be noted that the embodiment method of this application can be executed by a single device, such as a computer or server. This embodiments method can also be applied in distributed scenarios and is completed by multiple devices cooperating with each other. In this distributed scenario, one of the multiple devices can only execute one or more steps in the embodiment method of this application, and the multiple devices will interact with each other to complete the described Methods.

It should be noted that some embodiments of the present application are described above. Other embodiments are within the scope of the attached claims. In some cases, the actions or steps documented in claims can be performed in a different order than in the above embodiments and still achieve the desired results. Additionally, the processes depicted in the figures do not necessarily require the specific order shown, or sequential order, to achieve desirable results. Multitasking and parallel processing are also possible or may be advantageous in certain implementations.

Figure 5:
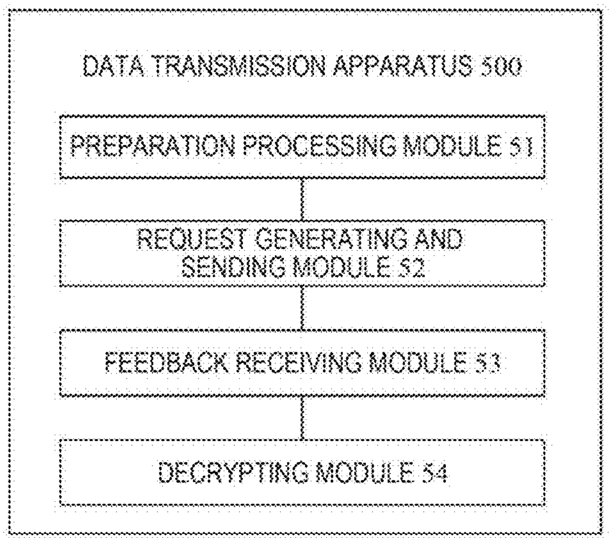
FIG. 5 is a structural block diagram of a data transmission apparatus provided on the trusted hardware end of the embodiments of the present application.

Based on the same inventive concept, this application also provides a data transmission device 500, which is set on the trusted hardware end. Referring to FIG. 5, the device comprises:

A preparation processing module 51, configured to receive a transmission preparation request sent by a user end before sending transmission data, and generate configuration information based on at least part of the data in the transmission preparation request;

A request generation and sending module 52, configured to generate an authentication request through the trusted execution environment based on the configuration information and send the authentication request to the user end, so that the user end envelope-encrypts the transmission data based on the authentication request;

A feedback receiving module 53, configured to receive feedback information sent from the user end, the feedback information comprises envelope-encrypted transmission data;

A decryption module 54, configured to obtain the transmission data by decrypting the feedback information.

In some embodiments, the preparation processing module 51 comprises:

A receiving unit, configured to receive from the user end a transmission preparation request that comprises at least one of a key length, an encryption mode, identification information of the user end and a second value;

A configuration unit, configured to generate configuration information by integrating at least one of the key length, the encryption mode, the identification information of the user end and the second value.

In some embodiments, the request generation and sending module 52 comprises:

A temporary public key generation unit, configured to generate a temporary public key based on the second value in the configuration information;

A function processing unit, configured to obtain second identification data by perform cryptographic operation processing on the identification information of the user end; obtain an operation processing result by performing cryptographic operation processing on the configuration information, the second identification data and the temporary public key, and generate quote data based on the operation processing result;

A request generation and sending unit, configured to generate an authentication request based on the configuration information, the second identification data, the temporary public key and the quote data and send the authentication request to the user end.

In some embodiments, the temporary public key generation unit, configured to: obtain the first public key of the trusted hardware end, randomly generate a first value, and generate a temporary public key based on the first public key, the first value and the second value.

In some embodiments, the cryptographic operation processing includes: hash operation processing.

In some embodiments, the function processing unit is specifically used to:

Obtaining a hash value by performing hash operation processing on data that is composed of the configuration information, the second identification data and the temporary public key; and obtaining report data by supplementing a predetermined number of supplementary values after the hash value, generating quote data by writing the report data to a user data report, and reading the quote data.

In some embodiments, the feedback information comprises: signature data, key cipher text, encrypted data and a user end certificate;

A decryption module 54 comprises:

A verification unit, configured to parse the feedback information, and verify the user end certificate using a root certificate, and confirm that the user end's identity is true after passing the verification; obtain a second public key of the user end, verifying the signature data using the second public key, and confirming that the signature data is true after passing the verification;

A decryption unit, configured to obtain a first private key of the trusted hardware end, and obtain key data by decrypting the key cipher text with the first private key, and obtain the transmission data by decrypting the encrypted data with the key data.

The device of the above embodiments is configured to implement the corresponding data transmission method in any of the above embodiments applied to the trusted hardware end, and has the beneficial effects of the corresponding method embodiments, which will not be described again here.

Figure 6:
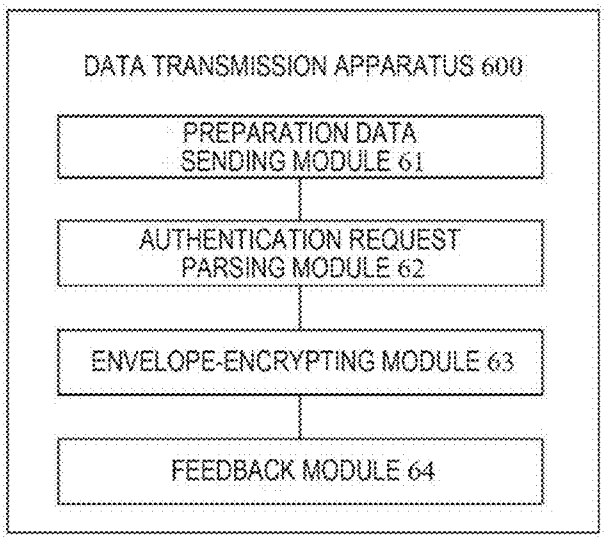
FIG. 6 is a structural block diagram of a data transmission apparatus provided on the user end of the embodiments of the present application.

Based on the same concept, the embodiments of this application also provide a data transmission device 600, which is set on the user end. As shown in FIG. 6, the device comprises:

The preparation data sending module 61, configured to send a transmission preparation request to the trusted hardware end based on the received transmission preparation data;

The authentication request parsing module 62, configured to receive the authentication request sent from the trusted hardware end and parse and confirm the authentication request;

The envelope encryption module 63, configured to perform envelope encryption on transmission data after determining that the authentication request is correct, and obtain envelope-encrypted transmission data;

The feedback module 64, configured to generate feedback information based on the envelope-encrypted transmission data, and send the feedback information to the trusted hardware end.

In some embodiments, the authentication request comprises: configuration information, second identification data and quote data;

The authentication request parsing module 62 comprises:

A parsing unit, configured to parse the authentication request to obtain configuration information, second identification data and quote data;

An identification confirmation unit, configured to perform cryptographic operations processing on identification information of the user end in the configuration information to obtain identification confirmation information, and compare and confirm the identification confirmation information with the second identification data;

A quote verification unit, configured to call Internet Authentication and Certificate Services to verify the quote data;

The envelope encryption module 63 is also used to:

Determining that the identification confirmation information matches the second identification data, and determining that the quote data passes the verification of the service information.

In some embodiments, the cryptographic operation processing comprises: hash operation processing.

In some embodiments, the authentication request also includes: a temporary public key;

The envelope-encryption module 63 comprises:

The data encryption unit, configured to determine key data and obtain encrypted data by encrypting the transmitted data with the key data;

The key encryption unit, configured to extract the first public key from the temporary public key, and obtain the key cipher text by encrypting the key data;

The combination unit, configured to form a data combination based on the temporary public key, the key cipher text, and the encrypted data;

The signature unit, configured to obtain the second private key of the user end, and obtain signature data by signing the data combination with use the second private key;

Wherein, the envelope-encrypted transmission data comprises: the signature data, the key cipher text and the encrypted data.

In some embodiments, the feedback module 64 is specifically used to:

obtain certificate data of the user end, and generating feedback information by combining the certificate data of the user end with the envelope-encrypted transmission data; and send the feedback information to the trusted hardware end, and outputting the key data and the temporary public key at the same time.

For the convenience of description, when describing the above device, the functions are divided into various modules and described separately. Of course, when implementing this application, the functions of each module can be implemented in the same or multiple software and/or hardware.

The device of the above embodiments is used to implement the corresponding data transmission method in any of the foregoing embodiments applied to the user end, and has the beneficial effects of the corresponding method embodiments, which will not be described again here.

Based on the same inventive concept, corresponding to any of the embodiment methods mentioned above, the present application also provides an electronic device, comprising a memory, a processor, and a computer program stored in the memory and executable on the processor. The processor executes the program implements the method described in any of the above embodiments.

Figure 7:
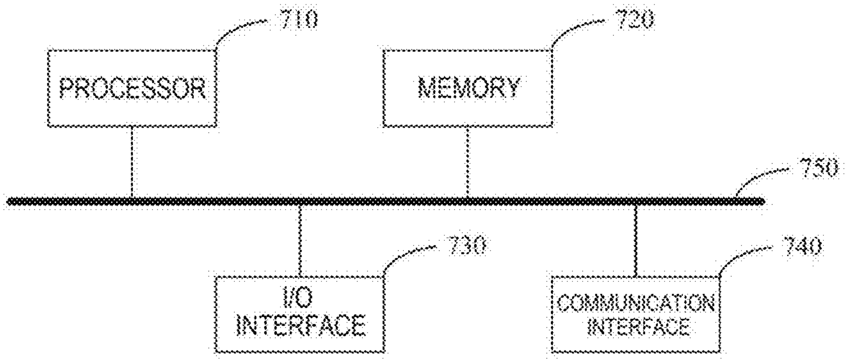
FIG. 7 is a schematic structural diagram of an electronic device of the embodiments of the present application.

FIG. 7 shows a more specific hardware structure diagram of the electronic device provided by this embodiment. The device may comprise: a processor 710, a memory 720, an input/output interface 730, a communication interface 740 and a bus 750. The processor 710, the memory 720, the input/output interface 730 and the communication interface 740 implement communication connections between each other within the device through the bus 750.

The processor 710 can be implemented by a general CPU (Central Processing Unit), a microprocessor, an application specific integrated circuit (Application Specific Integrated Circuit, ASIC), or one or more integrated circuits, and is used to execute related program to implement the technical solutions provided by the embodiments of this manual.

The memory 720 can be implemented in the form of ROM (Read Only Memory), RAM (Random Access Memory), static storage device, dynamic storage device, and the like. The memory 720 can store operating systems and other application programs. When the technical solutions provided by embodiments in this specification are implemented through software or firmware, the relevant program codes are stored in the memory 720 and called and executed by the processor 710.

The input/output interface 730 is configured to connect the input/output module to implement information input and output. The input/output module can be configured in the device as a component (not shown in the figure), also can be externally connected to the device to provide corresponding functions. Input devices can include keyboards, mice, touch screens, microphones, various sensors, and the like, and output devices can include monitors, speakers, vibrators, indicator lights, and the like.

The communication interface 740 is configured to connect a communication module (not shown in the drawings) to realize communication interaction between this device and other devices. The communication module can through wired (such as USB, network cable, and the like) or wirelessly (such as mobile network, WIFI, Bluetooth, and the like) to realize communicate.

Bus 750 includes a path that carries information between various components of the device (such as processor 710, memory 720, input/output interface 730, and communication interface 740).

It should be noted that although the above device only shows the processor 710, the memory 720, the input/output interface 730, the communication interface 740 and the bus 750, in a specific implementation, the device may also comprise other necessary components for normal operation. In addition, those skilled in the art can understand that the above-mentioned device may only include the necessary components to implement the embodiment solution in this specification, and does not necessarily include all the components shown in the drawings.

The electronic device of the above embodiments is configured to implement the corresponding data transmission method in any of the aforementioned embodiments, or the sentiment analysis method based on comment data, and has the beneficial effects of the corresponding method embodiments, which will not be described again here.

Based on the same inventive concept, corresponding to any of the above embodiment methods, the present application also provides a non-transitory computer-readable storage medium, the non-transitory computer-readable storage medium stores computer instructions, and the computer instructions are used for make the computer perform the data transmission method described in any of the above embodiments.

Computer-readable medium for this embodiment include permanent and non-permanent, removable and non-removable media that may be implemented by any method or technology for information storage. Information may be computer-readable instructions, data structures, modules of programs, or other data. Examples of computer storage medium include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic tape cassettes, tape magnetic disk storage or other magnetic storage devices or any other non-transmission medium can be used to store information that can be accessed by a computing device.

The computer instructions stored in the storage medium of the above embodiments are used to cause the computer to execute the method described in any of the above embodiments, and have the beneficial effects of the corresponding method embodiments, which will not be described again here.

Those of ordinary skill in the art should understand that the above discussion of any embodiments is only exemplary, and is not intended to imply that the scope of the present application (including claims) is limited to these examples; within the scope of this application, combinations between the technical features in the above embodiments or different embodiments are also possible, the steps can be implemented in any order, and there are many other variations of different aspects of the embodiments of the present application as described above, which are not provided in detail for the sake of briefly.

Additionally, to simplify illustration and discussion, and so as not to make the embodiments of this application difficult to understand, well-known power/ground connections to integrated circuit (IC) chips and other components may or may not be shown in the provided accompanying drawings. Furthermore, devices may be shown in block diagram form in order to avoid making the present embodiments difficult to understand, and this also takes into account the fact that the details regarding the implementation of these block diagram devices are highly dependent on the platform on which the present embodiments are to be implemented (i.e., these details should be well within the understanding of those skilled in the art). Where specific details (e.g., circuits) are set forth to describe the exemplary embodiments of the present application, it will be apparent to other skilled in the art that embodiments of the present application can be implemented without these specific details or with variations of these specific details. Accordingly, these descriptions should be considered illustrative and not limiting.

Although the present application has been described in conjunction with specific embodiments of the application, many substitutions, modifications and variations of these embodiments will be apparent to those of ordinary skill in the art according to the foregoing description. For example, other memory architectures (e.g., dynamic RAM (DRAM)) may use the discussed embodiments.

The embodiments of the present application are intended to cover all such substitutions, modifications and variations that fall within the broad scope of the appended claims. Therefore, any omissions, modifications, equivalent substitutions, improvements, and the like made within the spirit and principles of the embodiments of this application shall be included in the protection scope of this application.

What is claimed is:

1. A data transmission method, comprising:

generating configuration information based on at least part of data in a received transmission preparation request, the received transmission preparation request sent by a user end before sending transmission data;

generating an authentication request through a trusted execution environment based on the configuration information and sending the authentication request to the user end, so that the user end envelope-encrypts the transmission data based on the authentication request;

receiving feedback information sent from the user end, the feedback information comprising envelope-encrypted transmission data; and obtaining the transmission data by decrypting the feedback information, wherein the configuration information comprises identification information of the user end and a second value; and wherein generating the authentication request comprises:

generating a temporary public key based on the second value in the configuration information;

obtaining second identification data by performing cryptographic operation processing on the identification information of the user end;

obtaining an operation processing result by performing cryptographic operation processing on the configuration information, the second identification data and the temporary public key, and generating quote data based on the operation processing result; and generating the authentication request based on the configuration information the second identification data, the temporary public key and the quote data and sending the authentication request to the user end.

2. The method of claim 1, wherein generating the configuration information comprises:

receiving from the user end a transmission preparation request that comprises identification information of the user end and a second value; and generating the configuration information by integrating the identification information of the user end and the second value.

3. The method of claim 2, wherein generating the authentication request further comprises:

receiving from the user end a transmission preparation request that comprises at least one of a key length, an encryption mode; and generating the configuration information further comprises integrating at least one of the key length, the encryption mode.

4. The method of claim 3, wherein generating the temporary public key comprises:

obtaining a first public key of a trusted hardware end, randomly generating a first value, and generating the temporary public key based on the first public key, the first value and the second value.

5. The method of claim 4, wherein obtaining the operation processing result and generating the quote data comprise:

obtaining a hash value by performing hash operation processing on data that is composed of the configuration information, the second identification data and the temporary public key; and obtaining report data by supplementing a predetermined number of supplementary values after the hash value, generating quote data by writing the report data to a user data report, and reading the quote data.

6. The method of claim 1, wherein the feedback information comprises: signature data, key cipher text, encrypted data and a user end certificate, and obtaining the transmission data comprises:

parsing the feedback information, verifying the user end certificate using a root certificate, and confirming that the user end's identity is true after passing the verification;

obtaining a second public key of the user end, verifying the signature data using the second public key, and confirming that the signature data is true after passing the verification;

obtain a first private key of the trusted hardware end, and obtaining key data by decrypting the key cipher text with the first private key; and obtaining the transmission data by decrypting the encrypted data with the key data.

7. A data transmission method, comprising:

sending a transmission preparation request to a trusted hardware end based on received transmission preparation data;

receiving an authentication request sent from the trusted hardware end;

parsing and confirming the authentication request;

in response to determining that the authentication request is true, obtaining envelope-encrypted transmission data by performing envelope encryption on transmission data; and generating feedback information based on the envelope-encrypted transmission data, and sending the feedback information to the trusted hardware end, wherein the authentication request comprises: configuration information, second identification data and quote data;

parsing and confirming the authentication request comprises:

obtaining the configuration information, the second identification data and quote data by parsing the authentication request;

obtaining identification confirmation information by performing cryptographic operation processing on identification information of a user end in the configuration information, and comparing and confirming the identification confirmation information with the second identification data; and verifying the quote data by calling Internet authentication and certificate services;

and wherein determining that the authentication request is true comprises:

determining that the identification confirmation information matches the second identification data, and determining that the quote data passes a verification of the service information.

8. The method of claim 7, wherein the authentication request further comprises: a temporary public key, and obtaining envelope-encrypted transmission data by performing envelope encryption on the transmission data comprises:

determining key data, and obtaining encrypted data by encrypting the transmission data with the key data;

extracting a first public key from the temporary public key, and obtaining key cipher text by encrypting the key data;

forming a data combination based on the temporary public key, the key cipher text, and the encrypted data; and obtaining a second private key of the user end, and obtaining signature data by signing the data combination with use the second private key; and wherein, the envelope-encrypted transmission data comprises: the signature data, the key cipher text and the encrypted data.

9. The method of claim 8, wherein generating feedback information and sending the feedback information comprise:

obtaining certificate data of the user end, and generating feedback information by combining the certificate data of the user end with the envelope-encrypted transmission data; and sending the feedback information to the trusted hardware end, and outputting the key data and the temporary public key at the same time.

10. An electronic device, comprising:

a processor, and a memory for storing a computer program;

wherein, the computer program, when executed by the processor, causes the electronic device to:

generate configuration information based on at least part of data in a received transmission preparation request, the received transmission preparation request sent by a user end before sending transmission data;

generate an authentication request through a trusted execution environment based on the configuration information and sending the authentication request to the user end, so that the user end envelope-encrypts the transmission data based on the authentication request;

receive feedback information sent from the user end, the feedback information comprising envelope-encrypted transmission data; and obtain the transmission data by decrypting the feedback information, wherein the configuration information comprises identification information of the user end and a second value; and wherein generate the authentication request comprises:

generating a temporary public key based on the second value in the configuration information;

obtaining second identification data by performing cryptographic operation processing on the identification information of the user end;

obtaining an operation processing result by performing cryptographic operation processing on the configuration information, the second identification data and the temporary public key, and generating quote data based on the operation processing result; and generating the authentication request based on the configuration information, the second identification data, the temporary public key and the quote data and sending the authentication request to the user end.

11. The electronic device of claim 10, wherein the electronic device is further caused to:

receive from the user end a transmission preparation request that comprises identification information of the user end and a second value; and generate the configuration information by integrating the identification information of the user end and the second value.

12. The electronic device of claim 11, wherein the electronic device is further caused to:

receive from the user end a transmission preparation request that comprises at least one of a key length, an encryption mode; and generate the configuration information further comprises integrating at least one of the key length, the encryption mode.

13. The electronic device of claim 12, wherein the electronic device is further caused to:

obtain a first public key of a trusted hardware end, randomly generating a first value, and generating the temporary public key based on the first public key, the first value and the second value.

14. The electronic device of claim 13, wherein the electronic device is further caused to:

obtain a hash value by performing hash operation processing on data that is composed of the configuration information, the second identification data and the temporary public key; and obtain report data by supplementing a predetermined number of supplementary values after the hash value, generating quote data by writing the report data to a user data report, and reading the quote data.

15. The electronic device of claim 10, wherein the feedback information comprises: signature data, key cipher text, encrypted data and a user end certificate, and wherein the electronic device is further caused to:

parse the feedback information, verify the user end certificate using a root certificate, and confirm that the user end's identity is true after passing the verification;

obtain a second public key of the user end, verify the signature data using the second public key, and confirm that the signature data is true after passing the verification;

obtain a first private key of the trusted hardware end, and obtain key data by decrypting the key cipher text with the first private key; and obtain the transmission data by decrypting the encrypted data with the key data.

16. A non-transitory computer-readable storage medium, storing a computer program thereon, wherein, the computer program, when executed by a processor, causes a device to:

generate configuration information based on at least part of data in a received transmission preparation request, the received transmission preparation request sent by a user end before sending transmission data;

generate an authentication request through a trusted execution environment based on the configuration information and sending the authentication request to the user end, so that the user end envelope-encrypts the transmission data based on the authentication request;

receive feedback information sent from the user end, the feedback information comprising envelope-encrypted transmission data; and obtain the transmission data by decrypting the feedback information, wherein the configuration information comprises identification information of the user end and a second value; and wherein generate the authentication request comprises;

generating a temporary public key based on the second value in the configuration information;

obtaining second identification data by performing cryptographic operation processing on the identification information of the user end;

obtaining an operation processing result by performing cryptographic operation processing on the configuration information, the second identification data and the temporary public key, and generating quote data based on the operation processing result; and generating the authentication request based on the configuration information, the second identification data, the temporary public key and the quote data and sending the authentication request to the user end.

17. An electronic device, comprising:

a processor, and a memory for storing a computer program;

wherein, the computer program, when executed by the processor, causes the electronic device to:

send a transmission preparation request to a trusted hardware end based on received transmission preparation data;

receive an authentication request sent from the trusted hardware end;

parse and confirm the authentication request;

in response to determining that the authentication request is true, obtain envelope-encrypted transmission data by performing envelope encryption on transmission data; and generate feedback information based on the envelope-encrypted transmission data, and send the feedback information to the trusted hardware end, wherein the authentication request comprises: configuration information, second identification data and quote data;

parse and confirm the authentication request comprises:

obtaining the configuration information, the second identification data and quote data by parsing the authentication request;

obtaining identification confirmation information by performing cryptographic operation processing on identification information of the user end in the configuration information, and comparing and confirming the identification confirmation information with the second identification data; and verifying the quote data by calling Internet authentication and certificate services;

and wherein determine that the authentication request is true comprises:

determining that the identification confirmation information matches the second identification data, and determining that the quote data passes the verification of the service information.

18. The electronic device of claim 17, wherein the authentication request further comprises: a temporary public key, and obtaining envelope-encrypted transmission data by performing envelope encryption on the transmission data comprises:

determining key data, and obtaining encrypted data by encrypting the transmission data with the key data;

extract a first public key from the temporary public key, and obtaining key cipher text by encrypting the key data;

forming a data combination based on the temporary public key, the key cipher text, and the encrypted data; and obtaining a second private key of the user end, and obtaining signature data by signing the data combination with use the second private key; and wherein, the envelope-encrypted transmission data comprises: the signature data, the key cipher text and the encrypted data.

* * * * *